United States Patent
Tomiyama

(10) Patent No.: US 10,648,533 B2
(45) Date of Patent: May 12, 2020

(54) TORQUE FLUCTUATION INHIBITING DEVICE, TORQUE CONVERTER AND POWER TRANSMISSION DEVICE

(71) Applicant: EXEDY Corporation, Neyagawa-shi, Osaka (JP)

(72) Inventor: Naoki Tomiyama, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 0 days.

(21) Appl. No.: 16/084,656

(22) PCT Filed: Jun. 12, 2017

(86) PCT No.: PCT/JP2017/021622
§ 371 (c)(1),
(2) Date: Sep. 13, 2018

(87) PCT Pub. No.: WO2018/016229
PCT Pub. Date: Jan. 25, 2018

(65) Prior Publication Data
US 2019/0078644 A1   Mar. 14, 2019

(30) Foreign Application Priority Data
Jul. 20, 2016   (JP) .................................. 2016-142112

(51) Int. Cl.
*F16F 15/30* (2006.01)
*F16F 15/14* (2006.01)
(Continued)

(52) U.S. Cl.
CPC ...... *F16F 15/1457* (2013.01); *F16F 15/1407* (2013.01); *F16F 15/1464* (2013.01);
(Continued)

(58) Field of Classification Search
CPC ............... F16F 15/1457; F16F 15/1407; F16F 15/1464; F16F 15/31; F16H 45/02; F16H 25/125
See application file for complete search history.

(56) References Cited

U.S. PATENT DOCUMENTS 4,331,369 A * 5/1982 Lazar .................... A47B 88/427
312/334.8
5,471,896 A * 12/1995 Schierling ............. F16F 15/131
192/201
(Continued)

FOREIGN PATENT DOCUMENTS

| CN | 103582767 A | 2/2014 |
|---|---|---|
| CN | 104854368 A | 8/2015 |

(Continued)

OTHER PUBLICATIONS

International Search Report dated Jul. 11, 2017 for corresponding foreign Application No. PCT/JP2017/021622, pp. 2.
(Continued)

*Primary Examiner* — Thomas C Diaz
(74) *Attorney, Agent, or Firm* — United IP Counselors, LLC

(57) ABSTRACT

A torque fluctuation inhibiting device includes a mass body, a centrifugal element and a cam mechanism. The mass body is disposed in alignment with a rotor in an axial direction, and is rotatable relatively to the rotor. The cam mechanism includes a cam and a cam follower. When relative displacement occurs between the rotor and the mass body due to a centrifugal force that acts on the centrifugal element, the cam mechanism converts the centrifugal force into a circumferential force directed to reduce the relative displacement. Guide parts are provided on both ends of the centrifugal element. Each guide part makes contact with a member adjacent thereto in an opposite position to a contact point
(Continued)

between the cam and the cam follower through a center of gravity of the centrifugal element when the relative displacement occurs between the rotor and the mass body in the rotational direction.

10 Claims, 13 Drawing Sheets

(51) Int. Cl.
  *F16F 15/31* (2006.01)
  *F16H 45/02* (2006.01)
  *F16H 25/12* (2006.01)

(52) U.S. Cl.
  CPC ........... *F16F 15/31* (2013.01); *F16H 25/125* (2013.01); *F16H 45/02* (2013.01); *F16F 2230/0064* (2013.01); *F16H 2045/0231* (2013.01); *F16H 2045/0263* (2013.01); *F16H 2045/0294* (2013.01)

(56) References Cited

U.S. PATENT DOCUMENTS

| | | | |
|---|---|---|---|
| 7,335,107 B2* | 2/2008 | Brosowske | F16D 3/80 464/27 |
| 8,156,842 B2* | 4/2012 | Movlazada | F16F 15/12306 74/574.4 |
| 2013/0152729 A1* | 6/2013 | Maienschein | F16F 15/1407 74/572.21 |
| 2014/0090514 A1 | 4/2014 | Togel et al. | |
| 2015/0369296 A1 | 12/2015 | Lopez-Perez | |

FOREIGN PATENT DOCUMENTS

| | | | |
|---|---|---|---|
| DE | 10026663 A1 * | 12/2001 | .......... F16F 15/1407 |
| DE | 102011076790 A1 | 12/2012 | |
| FR | 3000155 A1 | 6/2014 | |
| JP | 02-46150 U | 3/1990 | |
| JP | 2014-516142 A | 7/2014 | |
| JP | 2015-094424 A | 5/2015 | |
| JP | 2016-502053 A | 1/2016 | |
| WO | 2012/163621 A1 | 12/2012 | |
| WO | 2013/118802 A1 | 8/2013 | |
| WO | 2014/096735 A1 | 6/2014 | |

OTHER PUBLICATIONS

Notice of Allowance of the corresponding Japanese Application No. 2016-142112, dated Jan. 28, 2020, 3 pp.

* cited by examiner

TORQUE FLUCTUATION INHIBITING DEVICE, TORQUE CONVERTER AND POWER TRANSMISSION DEVICE

CROSS-REFERENCE TO RELATED APPLICATIONS

This application is the U.S. National Phase of PCT International Application No. PCT/JP2017/021622, filed on Jun. 12, 2017. That application claims priority to Japanese Patent Application No. 2016-142112, filed Jul. 20, 2016. The contents of both applications are herein incorporated by reference in their entirety.

BACKGROUND

Technical Field

The present disclosure relates to a torque fluctuation inhibiting device, particularly to a torque fluctuation inhibiting device that inhibits torque fluctuations of a rotor into which a torque is inputted. Additionally, the present disclosure relates to a torque converter and a power transmission device, each of which includes the torque fluctuation inhibiting device.

Background Art

For example, a clutch device, including a damper device, and a torque converter are provided between an engine and a transmission in an automobile. Additionally, for reduction in fuel consumption, the torque converter is provided with a lock-up device that mechanically transmits a torque at a predetermined rotational speed or greater.

In general, the lock-up device includes a clutch part and a damper including a plurality of torsion springs. Additionally, the clutch part includes a piston to which a friction member is attached and that is pressed onto a front cover by an action of hydraulic pressure. Then in a lock-up on state, a torque is transmitted from the front cover to the piston through the friction member, and is further transmitted therefrom to an output-side member through the plural torsion springs.

In the lock-up device described above, torque fluctuations (fluctuations in rotational velocity) are inhibited by the damper including the plural torsion springs.

Incidentally, a lock-up device described in Japan Laid-open Patent Application Publication No. 2015-094424 is provided with a dynamic damper device including inertia members so as to inhibit torque fluctuations. The dynamic damper device described in Japan Laid-open Patent Application Publication No. 2015-094424 is attached to a plate supporting torsion springs, and includes a pair of inertia rings, which is rotatable relatively to the plate, and a plurality of coil springs disposed between the plate and the inertia rings.

BRIEF SUMMARY

Well-known dynamic damper devices, including the one described in Japan Laid-open Patent Application Publication No. 2015-094424, can reduce a peak of torque fluctuations in a predetermined rotational speed range. However, when an engine specification or so forth is changed, a rotational speed range in which a peak of torque fluctuations appears varies in accordance therewith. Therefore, the inertia amount of the inertia rings and the spring constant of the coil springs are required to be changed in accordance with the change of the engine specification or so forth. However, coping with the change may be difficult in some cases.

It is an object of the present disclosure to make it possible, in a device that inhibits torque fluctuations of a rotary member, to reduce a peak of torque fluctuations in a relatively wide rotational speed range.

Solution to Problems (1) A torque fluctuation inhibiting device according to the present disclosure is a device for inhibiting torque fluctuations in a rotor into which a torque is inputted, and includes a mass body, a centrifugal element and a cam mechanism. The mass body is disposed in alignment with the rotor in an axial direction, is rotatable with the rotor, and is rotatable relatively to the rotor. The centrifugal element is disposed to receive a centrifugal force to be generated by rotation of the rotor and the mass body. The cam mechanism includes a cam and a cam follower moving along the cam. When a relative displacement occurs between the rotor and the mass body in a rotational direction due to the centrifugal force acting on the centrifugal element, the cam mechanism converts the centrifugal force into a circumferential force directed to reduce the relative displacement.

The cam is provided on the centrifugal element. The cam follower is provided on either of the rotor and the mass body. Additionally, the centrifugal element has a shape extending in the rotational direction, and includes a guide part on both ends thereof in the rotational direction. The guide part makes contact with a member adjacent thereto so as to guide movement of the centrifugal element. Moreover, the guide part of the centrifugal element makes contact with the member adjacent thereto in an opposite position to a contact point between the cam and the cam follower through a center of gravity of the centrifugal element when the relative displacement occurs between the rotor and the mass body in the rotational direction.

When a torque is inputted into the rotor in this device, the rotor and the mass body are rotated. When the torque inputted into the rotor does not fluctuate, a relative displacement does not occur between the rotor and the mass body in the rotational direction. Therefore, the rotor and the mass body are rotated in synchronization with each other. On the other hand, when the torque inputted into the rotor fluctuate, a relative displacement occurs between the mass body and the rotor in the rotational direction (the displacement will be hereinafter expressed as "rotational phase difference" on an as-needed basis) depending on the extent of torque fluctuations, because the mass body is disposed to be rotatable relatively to the rotor.

When the rotor and the mass body are herein rotated, the centrifugal element receives a centrifugal force. Then, when the relative displacement occurs between the rotor and the mass body, the cam mechanism is actuated to convert the centrifugal force acting on the centrifugal element into a circumferential force so as to reduce the relative displacement between the rotor and the mass body by the circumferential force. Torque fluctuations are inhibited by the herein described actuation of the cam mechanism.

The centrifugal force acting on the centrifugal element is herein used as a force for inhibiting torque fluctuations. Hence, a characteristic of inhibiting torque fluctuations varies in accordance with the rotational speed of the rotor. Additionally, the characteristic of inhibiting torque fluctuations can be appropriately set by, for instance, the cam shape or so forth. Hence, a peak of torque fluctuations can be reduced in as wide a rotational speed range as possible.

Moreover, when the cam mechanism is actuated in occurrence of the relative displacement between the rotor and the mass body in the rotational direction, the guide part of the centrifugal element makes contact with the member adjacent thereto at least in an opposite position to the contact point between the cam and the cam follower through the center of gravity of the centrifugal element. Therefore, it is possible to inhibit occurrence of a rotational moment that acts on the centrifugal element while one rotation-directional end of the centrifugal element functions as a point of fulcrum. Consequently, the centrifugal element is smoothly moved, and the configuration of the guide part can be simplified.

(2) The mass body can include a first inertia ring and a second inertia ring that are disposed in opposition through the rotor.

The inertia rings are herein disposed on both sides of the rotor in the axial direction. Hence, the inertia amount can be enlarged while the device is inhibited in radial dimension. This effectively works for inhibition of torque fluctuations.

(3) The mass body can further include a pin. The pin penetrates the rotor in the axial direction, and couples the first inertia ring and the second inertia ring such that the first inertia ring and the second inertia ring are non-rotatable relatively to each other. Additionally, the centrifugal element can be disposed on an outer peripheral part of the rotor and on an inner peripheral side of the pin while being disposed between the first inertia ring and the second inertia ring in the axial direction. Moreover, the cam follower is a cylindrical roller. The cylindrical roller includes a hole in an inner part thereof, and the hole is penetrated by the pin in the axial direction. Furthermore, the cam is provided on the centrifugal element so as to make contact with the cam follower, and has a shape making the circumferential force vary in accordance with an amount of the relative displacement between the rotor and the mass body in the rotational direction.

Attachment of the cam follower is herein done with use of the pin coupling the first inertia ring and the second inertia ring. Therefore, the configuration of the cam mechanism is simplified.

(4) The rotor can include a protruding part on an outer peripheral surface thereof. The centrifugal element can include a first member and a second member. The first and second members are disposed to interpose the protruding part therebetween in the axial direction. Additionally, the guide part of the centrifugal element couples the first member and the second member and makes contact with both lateral surfaces of the protruding part of the rotor.

(5) The guide part can be a pair of rollers that is rotatably supported by both ends of the centrifugal element in a rotational direction and rolls on both lateral surfaces of the protruding part of the rotor.

When it is assumed that a rotational moment is configured to act on the centrifugal element while one rotation-directional end of the centrifugal element functions as a point of fulcrum, it is required to provide, for instance, a pair of rollers on each of the inner peripheral side and the outer peripheral side (i.e., totally two pairs of rollers) as the guide part so as to smoothly move the centrifugal element.

However, in the present advancement, as described above, a rotational moment is configured to be inhibited from acting on the centrifugal element while one rotation-directional end of the centrifugal element functions as a point of fulcrum. Hence, even when the guide part is composed of only a pair of rollers, the centrifugal element can be smoothly moved.

(6) The mass body can further include a pin. The pin penetrates the rotor in the axial direction, and couples the first inertia ring and the second inertia ring such that the first inertia ring and the second inertia ring are non-rotatable relatively to each other. Additionally, the centrifugal element can be disposed on an inner peripheral side of the pin while being disposed between the first inertia ring and the second inertia ring in the axial direction. Moreover, the cam follower is a cylindrical roller. The cylindrical roller includes a hole in an inner part thereof, and the hole is penetrated by the pin in the axial direction. Furthermore, the cam is provided on the centrifugal element so as to make contact with the cam follower, and has a shape making the circumferential force vary in accordance with an amount of the relative displacement between the rotor and the mass body in the rotational direction.

(7) The rotor can include a protruding part protruding to the inner peripheral side. The centrifugal element can include a first member and a second member. The first member and the second member are disposed to interpose the protruding part therebetween in the axial direction. Additionally, the guide part of the centrifugal element couples the first member and the second member and makes contact with both lateral surfaces of the protruding part of the rotor.

(8) The mass body can have a continuous annular shape.

(9) A torque converter according to the present disclosure is disposed between an engine and a transmission. The torque converter includes an input-side rotor into which a torque is inputted from the engine, an output-side rotor outputting the torque to the transmission, a damper disposed between the input-side rotor and a turbine, and the torque fluctuation inhibiting device recited in any of the above.

(10) A power transmission device according to the present disclosure includes a flywheel, a clutch device and the torque fluctuation inhibiting device recited in any of the above. The flywheel includes a first inertia body, a second inertia body and a damper. The first inertia body is rotated about a rotational axis. The second inertia body is rotated about the rotational axis, and is rotatable relatively to the first inertia body. The damper is disposed between the first inertia body and the second inertia body. The clutch device is provided on the second inertia body of the flywheel.

According to the present advancement described above, in a device that inhibits torque fluctuations in a rotary member, a peak of torque fluctuations can be reduced in a relatively wide rotational speed range. Additionally, according to the present disclosure, a centrifugal element can be smoothly moved with a simple configuration of a guide part.

DETAILED DESCRIPTION OF EMBODIMENTS

First Exemplary Embodiment

Figure 1:
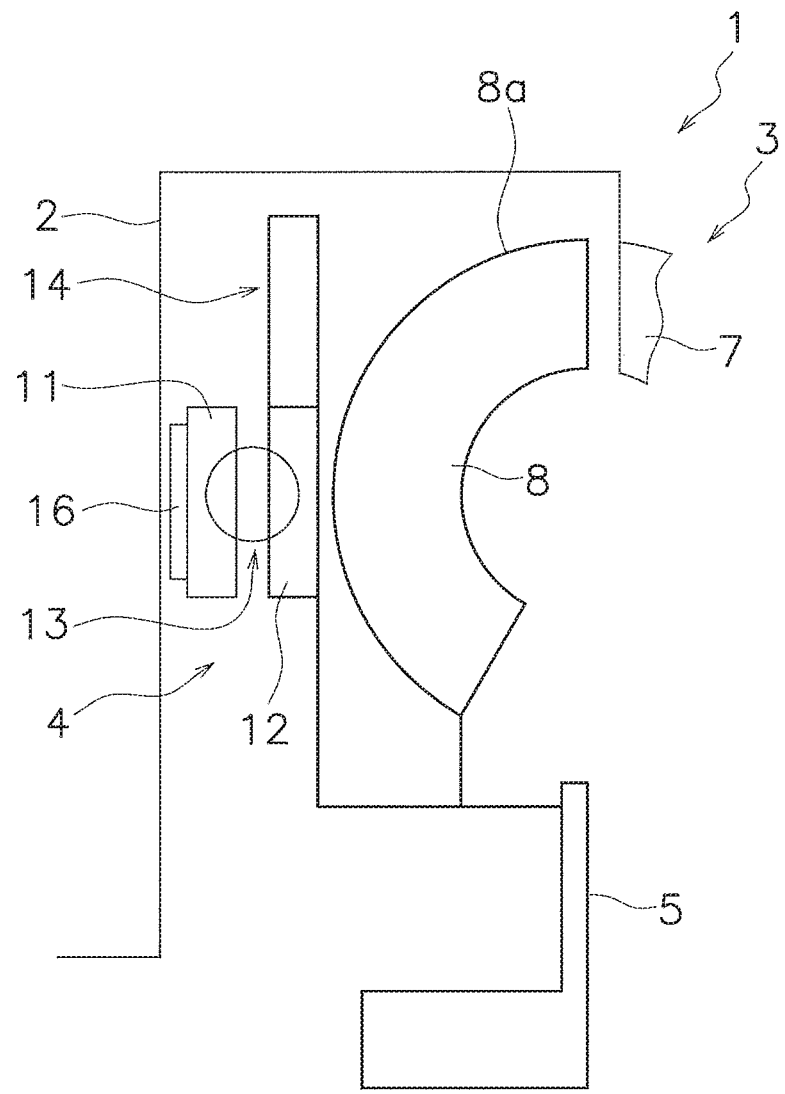
FIG. 1 is a schematic diagram of a torque converter according to a first exemplary embodiment of the present disclosure.

FIG. 1 is a schematic diagram in a condition that a torque fluctuation inhibiting device according to a first exemplary embodiment of the present disclosure is attached to a lock-up device of a torque converter. In FIG. 1, line O-O indicates a rotational axis of the torque converter.

Entire Configuration

A torque converter 1 includes a front cover 2, a torque converter body 3, a lock-up device 4 and an output hub 5. A torque is inputted into the front cover 2 from an engine. The torque converter body 3 includes an impeller 7 coupled to the front cover 2, a turbine 8 and a stator (not shown in the drawings). The turbine 8 is coupled to the output hub 5, and an input shaft of a transmission (not shown in the drawings) is capable of being spline-coupled to the inner peripheral part of the output hub 5.

Lock-up Device 4

The lock-up device 4 includes a clutch part, a piston to be actuated by hydraulic pressure, and so forth, and is settable to a lock-up on state and a lock-up off state. In the lock-up on state, the torque inputted into the front cover 2 is transmitted to the output hub 5 through the lock-up device 4 without through the torque converter body 3. On the other hand, in the lock-up off state, the torque inputted into the front cover 2 is transmitted to the output hub 5 through the torque converter body 3.

The lock-up device 4 includes an input-side rotor 11, an output-side rotor 12, a damper 13 and a torque fluctuation inhibiting device 14.

The input-side rotor 11 includes an axially movable piston, and is provided with a friction member 16 on the front cover 2—side lateral surface thereof. When the friction member 16 is pressed onto the front cover 2, the torque is transmitted from the front cover 2 to the input-side rotor 11.

The output-side rotor 12 is disposed axially in opposition to the input-side rotor 11 and is rotatable relatively to the input-side rotor 11. The output-side rotor 12 is coupled to the output hub 5.

The damper 13 is disposed between the input-side rotor 11 and the output-side rotor 12. The damper 13 includes a plurality of torsion springs and elastically couples the input-side rotor 11 and the output-side rotor 12 in a rotational direction. The damper 13 transmits the torque from the input-side rotor 11 to the output-side rotor 12, and also, absorbs and attenuates torque fluctuations.

Torque Fluctuation Inhibiting Device 14

Figure 2:
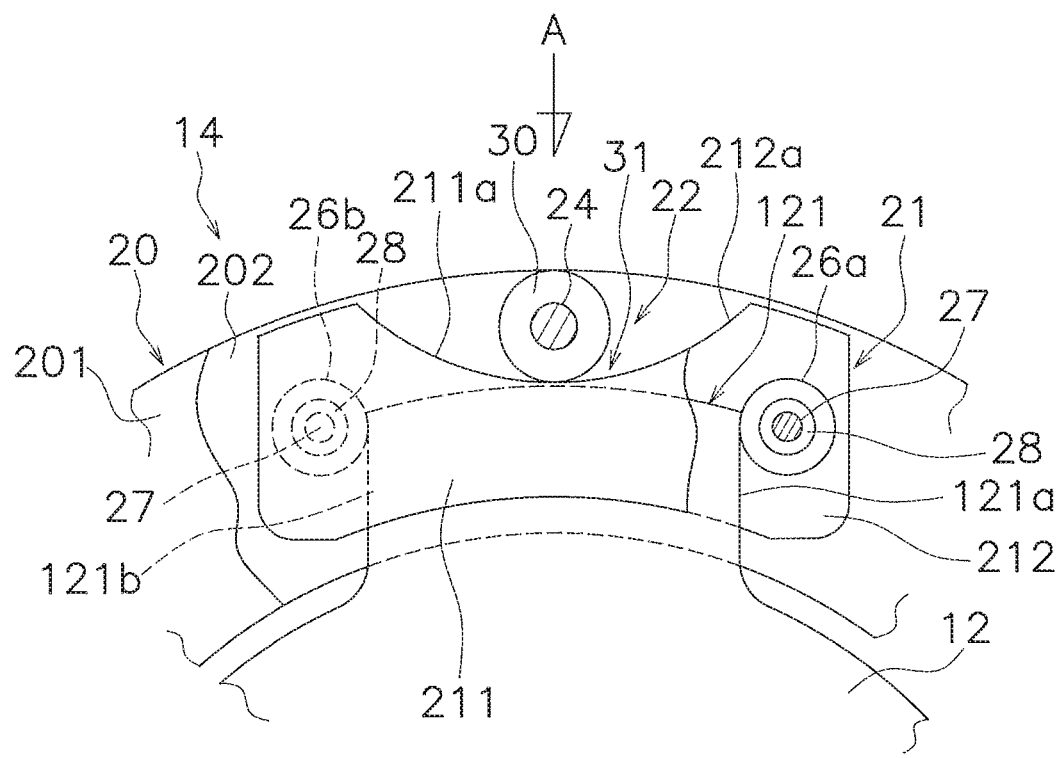
FIG. 2 is a partial front view of an output-side rotor and a torque fluctuation inhibiting device.
Figure 3:
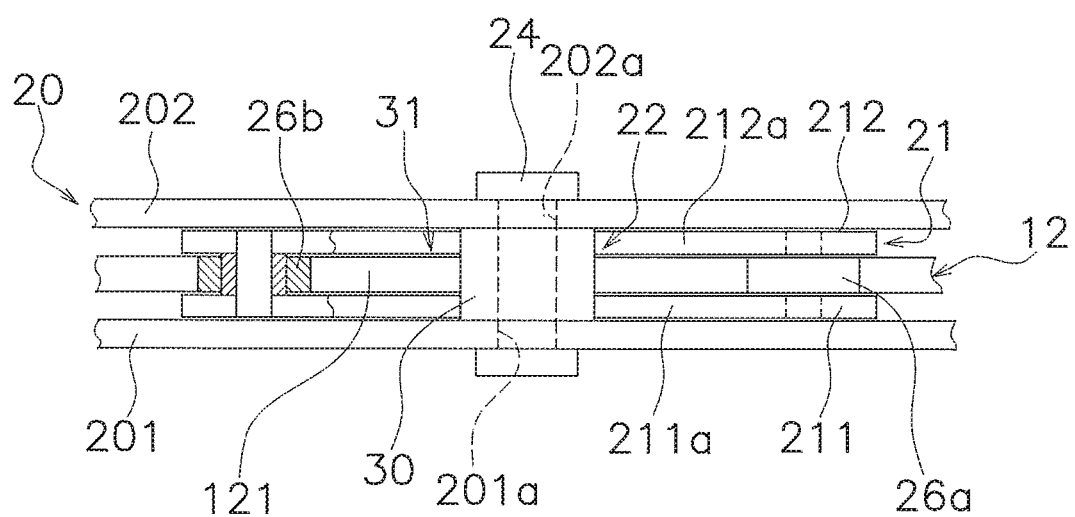
FIG. 3 is a view of FIG. 2 as seen from arrow A.

FIG. 2 is a front view of the output-side rotor 12 and the torque fluctuation inhibiting device 14. It should be noted that FIG. 2 shows part of the output-side rotor 12 and the torque fluctuation inhibiting device 14. As a whole, four constructions, each of which is shown in FIG. 2, are disposed in four circumferential positions at equal angular intervals. On the other hand, FIG. 3 is a view of FIG. 2 as seen from a direction A.

The torque fluctuation inhibiting device 14 includes first and second inertia rings 201 and 202, which compose a mass body 20, four centrifugal elements 21 and four cam mechanisms 22.

Each of the first and second inertia rings 201 and 202 is a continuous annular plate having a predetermined thickness. As shown in FIG. 3, the first and second inertia rings 201 and 202 are disposed axially on both sides of the output-side rotor 12 such that a predetermined gap is produced between the output-side rotor 12 and each inertia ring 201, 202. In other words, the output-side rotor 12 and the first and second inertia rings 201 and 202 are disposed in axial alignment. The first and second inertia rings 201 and 202 have a common rotational axis that is the same as the rotational axis of the output-side rotor 12. The first and second inertia rings 201 and 202 are rotatable with the output-side rotor 12, and are also rotatable relatively to the output-side rotor 12.

Each of the first and second inertia rings 201 and 202 includes holes 201a, 202a, each of which axially penetrates therethrough. Additionally, the first and second inertia rings 201 and 202 are fixed by rivets 24 that penetrate the holes 201a and 202a thereof. Therefore, the first inertia ring 201 is axially, radially and rotation-directionally immovable with respect to the second inertia ring 202.

The output-side rotor 12 has a disc shape, and as described above, is coupled at the inner peripheral part thereof to the output hub 5. The output-side rotor 12 includes four protruding parts 121 on the outer peripheral part thereof, and each protruding part 121 has a predetermined width in the circumferential direction. The protruding parts 121 are inserted axially between the first inertia ring 201 and the second inertia ring 202. Each protruding part 121 is formed such that the outer peripheral end thereof is located approximately in the middle of the inner radius and the outer radius of each first and second inertia ring 201, 202. More specifically, as described below, a roller 30 composing each cam mechanism 22 is moved along a cam 31, but the outer diameter of each protruding part 121 is set such that while moving, the roller 30 is prevented from making contact with the outer peripheral end surface of each protruding part 21.

Each centrifugal element 21 includes a first member 211 and a second member 212, each of which extends in the rotational direction. The first and second members 211 and 212 have the same shape and are disposed at a predetermined gap in the axial direction. The first and second members 211 and 212 are disposed axially between the first inertia ring 201 and the second inertia ring 202. The first and second members 211 and 212 are disposed on the inner peripheral side of each rivet 24, while interposing each protruding part 121 of the output-side rotor 12 therebetween. Each centrifugal element 21 is rotated together with the output-side rotor 12, and is radially movable by a centrifugal force generated by rotation of the output-side rotor 12.

More specifically, one first guide roller 26a and one second guide roller 26b (a guide part) are disposed on both lengthwise directional (rotation directional) ends of the first and second members 211 and 212. The first and second guide rollers 26a and 26b are rotatably attached about pins 27, supported by both ends of the first and second members 211 and 212, through bushings 28. Additionally, the first guide roller 26a is capable of rolling in contact with one lateral surface 121a of each protruding part 121 at the outer peripheral surface thereof, whereas the second guide roller 26b is capable of rolling in contact with the other lateral surface 121b of each protruding part 121 at the outer peripheral surface thereof.

It should be noted that in each centrifugal element 21, the first and second members 211 and 212 include outer peripheral surfaces 211a and 212a, respectively, each of which is recessed in a circular-arc shape to the inner peripheral side. As described below, the outer peripheral surfaces 211a and 212a function as each cam 31.

Each cam mechanism 22 is composed of each cylindrical roller 30 functioning as a cam follower and each cam 31 corresponding to the outer peripheral surfaces 211a and 212a of the first and second members 211 and 212. Each roller 30 is fitted onto the outer periphery of the trunk of each rivet 24. In other words, each roller 30 is supported by each rivet 24. It should be noted that each roller 30 is preferably attached to each rivet 24 in a rotatable manner, but alternatively, can be attached to each rivet 24 in a non-rotatable manner. Each cam 31 is a circular-arc surface with which each roller 30 makes contact. Each roller 30 is moved along each cam 31 when the output-side rotor 12 and the first and second inertia rings 201 and 202 are rotated relatively to each other in a predetermined angular range.

Although described below in detail, when rotational phase difference between the output-side rotor 12 and the first and second inertia rings 201 and 202 is produced by the contact between each roller 30 and each cam 31, a centrifugal force generated in each centrifugal element 21 is converted into a circumferential force by which the rotational phase difference is reduced.

Actuation of Cam Mechanisms 22

Actuation of each cam mechanism 22 (inhibition of torque fluctuations) will be explained with FIGS. 2, 4 and 5. It should be noted that in the following explanation, a pair of first and second inertia rings 201 and 202 will be simply referred to as "an inertia ring 20" on an as-needed basis.

In the lock-up on state, a torque transmitted to the front cover 2 is transmitted to the output-side rotor 12 through the input-side rotor 11 and the damper 13.

When torque fluctuations do not exist in torque transmission, the output-side rotor 12 and each inertia ring 20 are rotated in the condition shown in FIG. 2. In this condition, the roller 30 in each cam mechanism 22 is contacted to the most inner peripheral position (circumferential middle position) of the cam 31, and rotational phase difference between the output-side rotor 12 and each inertia ring 20 is "0".

As described above, the rotation-directional relative displacement between the output-side rotor 12 and each inertia ring 20 is referred to as "rotational phase difference". In FIGS. 2, 4 and 5, these terms indicate displacement between the circumferential middle position of each centrifugal element 21 and each cam 31 and the center position of each roller 30.

Figure 4:
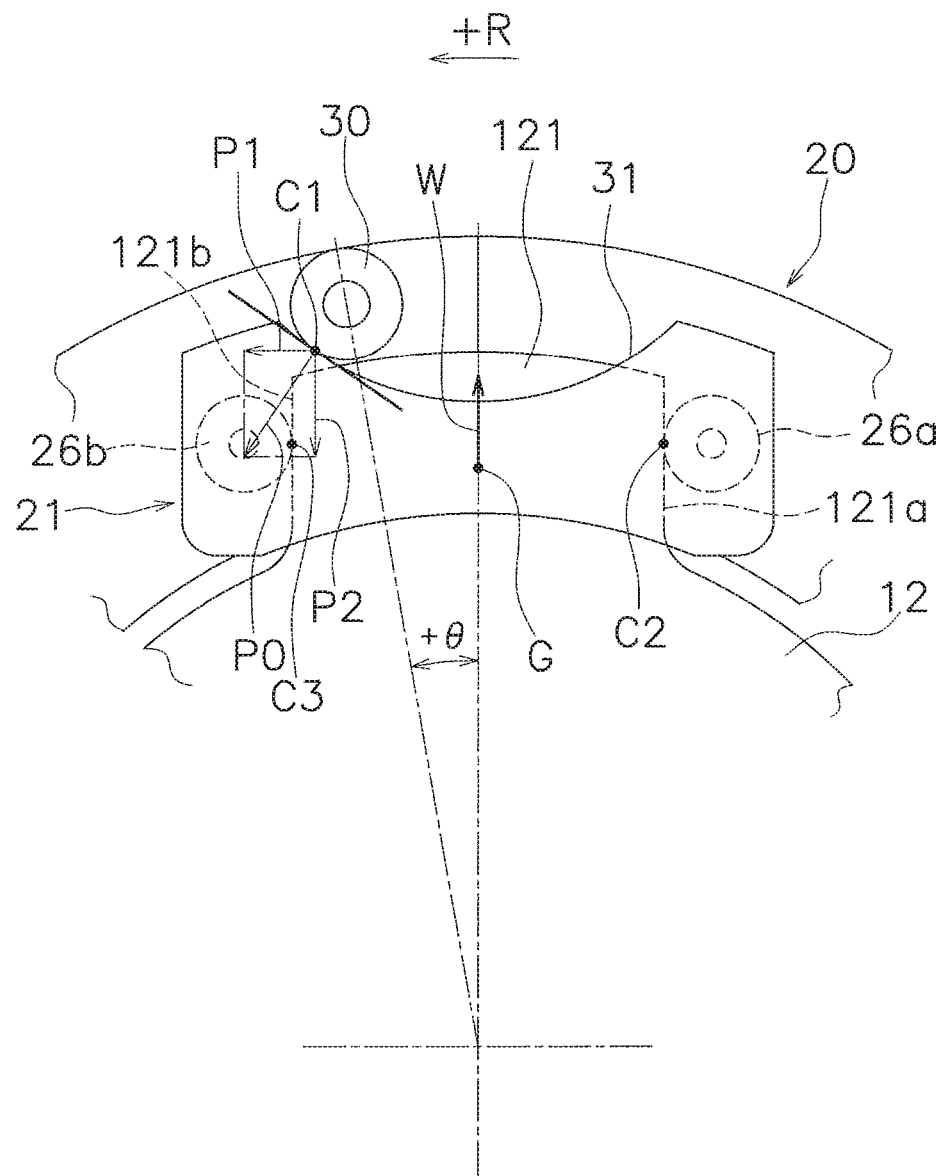
FIG. 4 is a diagram for explaining actuation of a cam mechanism.
Figure 5:
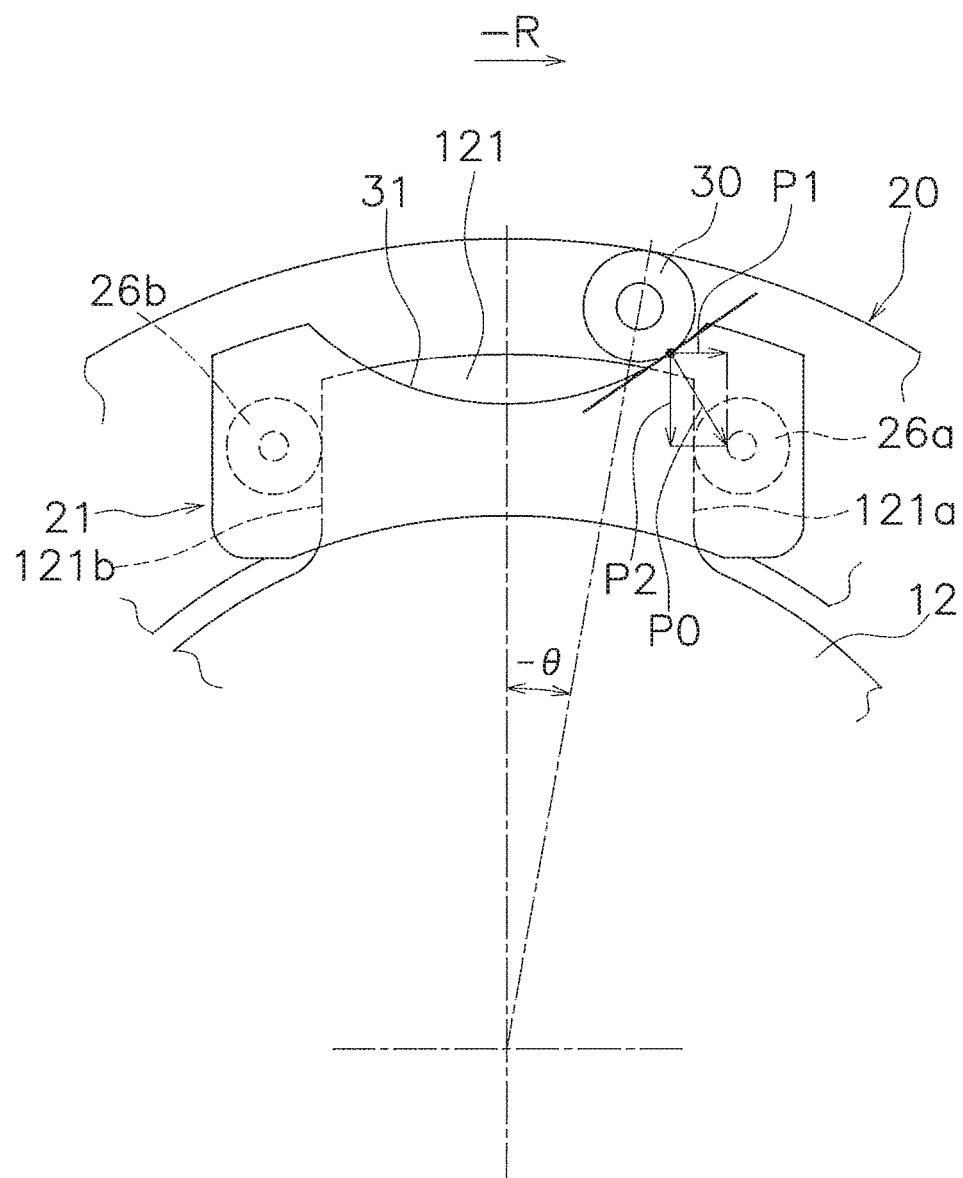
FIG. 5 is a diagram for explaining the actuation of the cam mechanism.

When torque fluctuations herein exist in torque transmission, rotational phase difference ±θ is produced between the output-side rotor 12 and each inertia ring 20 as shown in FIGS. 4 and 5. FIG. 4 shows a condition that rotational phase difference +θ is produced to a +R side, whereas FIG. 5 shows a condition that rotational phase difference −θ is produced to a −R side.

As shown in FIG. 4, when the rotational phase difference +θ is produced between the output-side rotor 12 and each inertia ring 20, the roller 30 of each cam mechanism 22 is relatively moved along the cam 31 to the left side of FIG. 4. At this time, a centrifugal force acts on each centrifugal element 21. Hence, a reaction force to be received by the cam 31 formed on each centrifugal element 21 from the roller 30 has a direction and a magnitude indicated by P0 in FIG. 4. A first force component P1 and a second force component P2 are produced by the reaction force P0. The first force component P1 is directed in the circumferential direction, whereas the second force component P2 is directed to move each centrifugal element 21 to the inner peripheral side.

Additionally, the first force component P1 acts as a force to move the output-side rotor 12 to the leftward in FIG. 4 through each cam mechanism 22 and each centrifugal element 21. In other words, a force directed to reduce the rotational phase difference between the output-side rotor 12 and each inertia ring 20 acts on the output-side rotor 12. On the other hand, the second force component P2 moves each centrifugal element 21 to the inner peripheral side against the centrifugal force.

FIG. 5 shows a condition that the rotational phase difference −θ is produced between the output-side rotor 12 and each inertia ring 20. FIG. 5 is similar to FIG. 4 regarding the actuation of each cam mechanism 22, although FIG. 5 is different from FIG. 4 only regarding the moving direction of the roller 30 of each cam mechanism 22 and the directions of the reaction force P0, the first force component P1 and the second force component P2.

As described above, when rotational phase difference is produced between the output-side rotor 12 and each inertia ring 20 by torque fluctuations, the output-side rotor 12 receives a force (first force component P1) directed to reduce the rotational phase difference between both by the centrifugal force acting on each centrifugal element 21 and the effective operation of each cam mechanism 22. Torque fluctuations are inhibited by this force.

The aforementioned force inhibiting torque fluctuations varies in accordance with the centrifugal force, in other words, the rotational speed of the output-side rotor 12, and also varies in accordance with the rotational phase difference and the shape of each cam 31. Therefore, by suitably setting the shape of each cam 31, characteristics of the torque fluctuation inhibiting device 14 can be made optimal in accordance with the specification of the engine and so forth.

For example, each cam 31 can be made in a shape that makes the first force component P1 linearly vary in accordance with the rotational phase difference in a condition where the centrifugal force acting is constant. Alternatively, each cam 31 can be made in a shape that makes the first force component P1 non-linearly vary in accordance with the rotational phase difference.

Exemplary Characteristics

Figure 6:
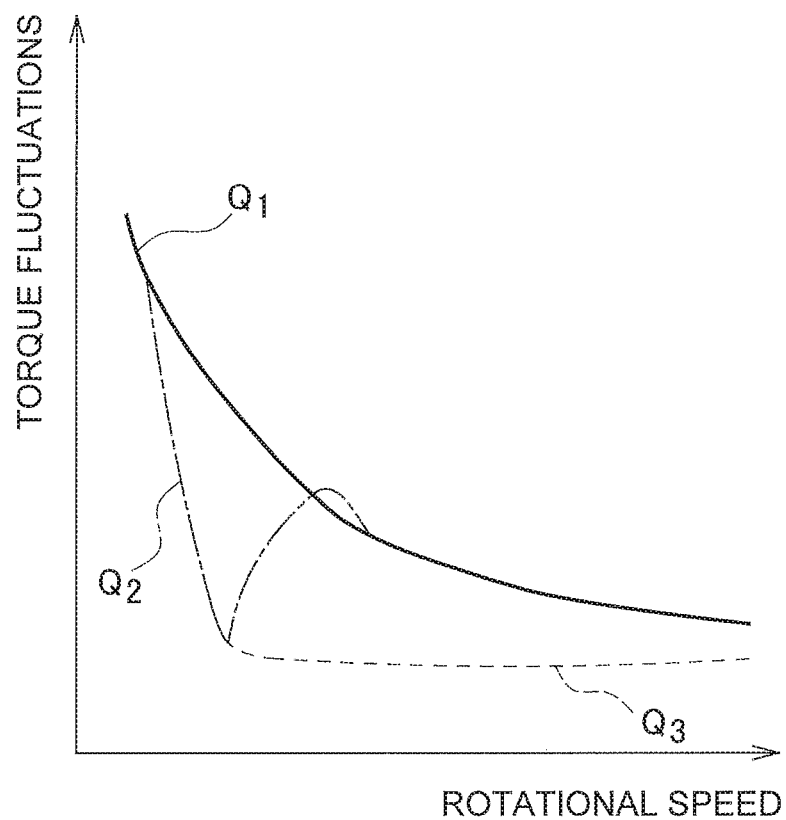
FIG. 6 is a characteristic diagram showing a relation between rotational speed and torque fluctuations.

FIG. 6 is a diagram showing exemplary torque fluctuation inhibiting characteristics. The horizontal axis indicates rotational speed, whereas the vertical axis indicates torque fluctuations (rotation velocity fluctuation). Characteristic Q1 indicates a condition without installation of a device for inhibiting torque fluctuations; characteristic Q2 indicates a condition with installation of a well-known dynamic damper device; and characteristic Q3 indicates a condition with installation of the torque fluctuation inhibiting device 14 of the present exemplary embodiment.

As is obvious from FIG. 6, in an apparatus in which the well-known dynamic damper device is installed (characteristic Q2), torque fluctuations can be inhibited only in a specific rotational speed range. By contrast, in the present exemplary embodiment (characteristic Q3), torque fluctuations can be inhibited through the entire rotational speed ranges.

Actuation of Centrifugal Elements 21

For example, as shown in FIG. 4, when the rotational phase difference is produced between the output-side rotor 12 and each inertia ring 20, the force P0 is applied to each centrifugal element 21 from each inertia ring 20 at a contact point C1 with the roller 30. The force P0 causes the first guide roller 26a attached to each centrifugal element 21 and the one lateral surface 121a of each protruding part 121 to make contact with each other at a contact point C2, and also causes the second guide roller 26b and the other lateral surface 121b of each protruding part 121 to make contact with each other at a contact point C3. In other words, as shown in FIG. 4, when the rotational phase difference +θ is produced between the output-side rotor 12 and each inertia ring 20, forces act at least on the contact points C1 and C2 located on both sides of a center of gravity G of each centrifugal element 21 (although a force also acts on the contact point C3). In this case, with the contact point C2 functioning as a point of fulcrum, a clockwise moment due to a centrifugal force W acting on the center of gravity G acts on each centrifugal element 21, and simultaneously, a counter-clockwise moment due to the force P0 acts on the contact point C1. Due to this, a large rotational moment does not act on only one side of each centrifugal element 21. Therefore, tilt of each centrifugal element 21 can be inhibited, and each centrifugal element 21 can be smoothly moved in the radial direction only with the two guide rollers 26a and 26b.

Second Exemplary Embodiment

Figure 7:
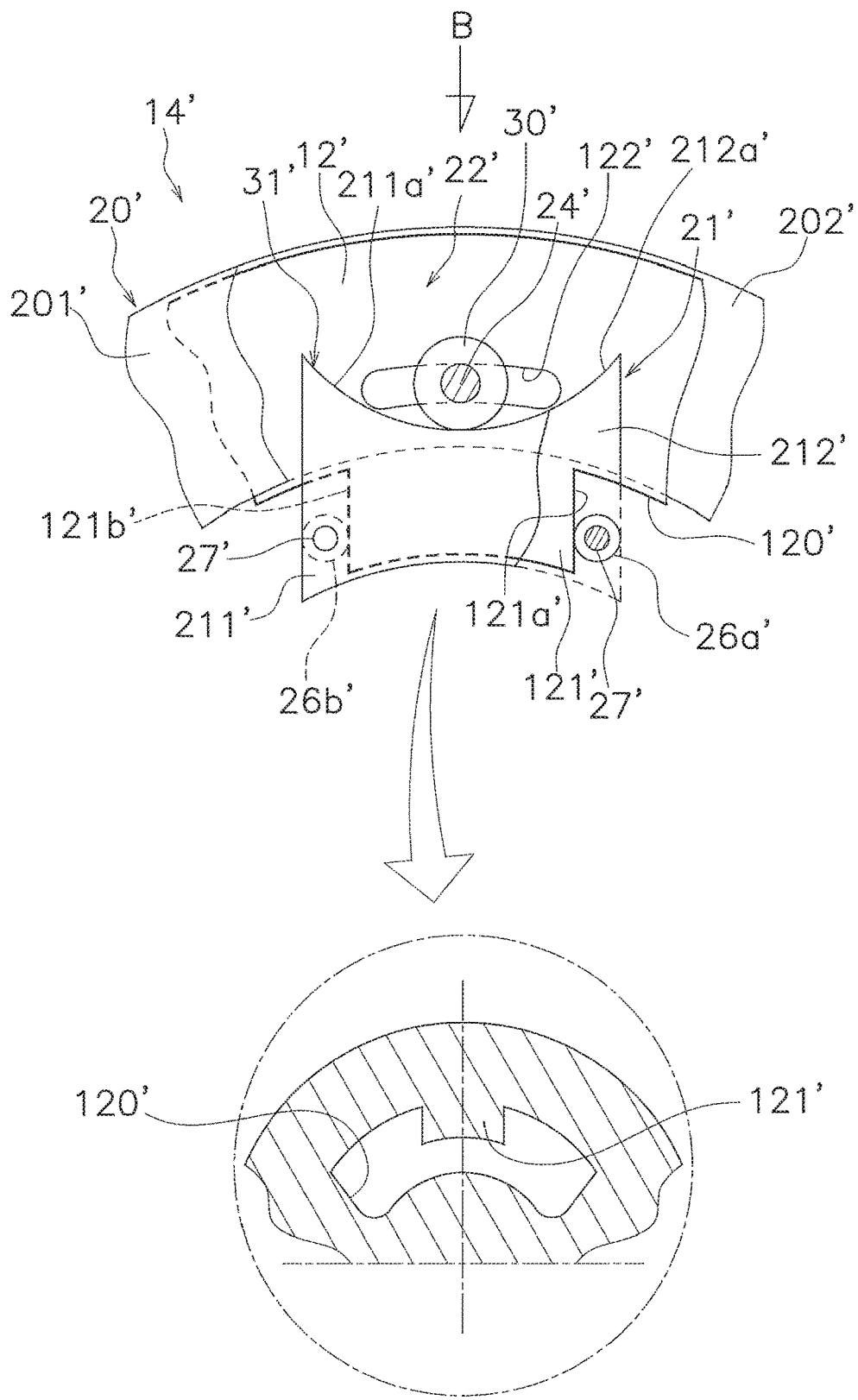
FIG. 7 is a diagram corresponding to FIG. 2 in a second exemplary embodiment of the present disclosure.
Figure 8:
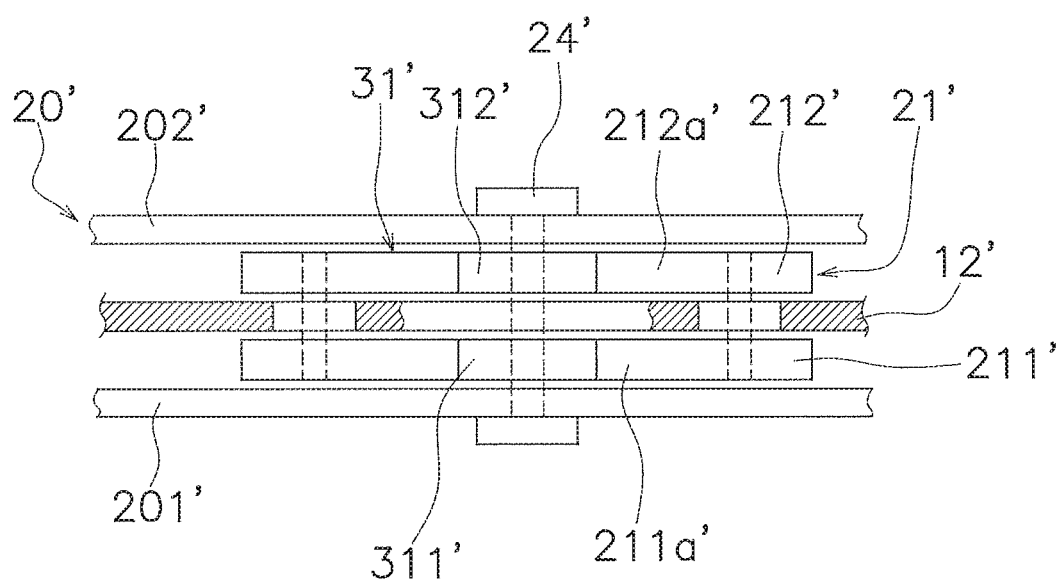
FIG. 8 is a diagram of FIG. 7 as seen from arrow B.

FIG. 7 shows a second exemplary embodiment of the present disclosure. FIG. 7 is a diagram corresponding to FIG. 2 of the first exemplary embodiment. Similarly to the above, in the second exemplary embodiment, four constructions, each of which is shown in FIG. 7, are disposed in four circumferential positions at equal angular intervals. On the other hand, FIG. 8 is a view of FIG. 7 as seen from a direction B.

A torque fluctuation inhibiting device 14' according to the second exemplary embodiment includes first and second inertia rings 201' and 202', which compose a mass body 20', four centrifugal elements 21' and four cam mechanisms 22'.

Each of the first and second inertia rings 201' and 202' is a continuous annular plate having a predetermined thickness. As shown in FIG. 8, the first and second inertia rings 201' and 202' are disposed axially on both sides of an output-side rotor 12' such that a predetermined gap is produced between the output-side rotor 12' and each inertia ring 201', 202'. The first and second inertia rings 201' and 202' have a common rotational axis that is the same as the rotational axis of the output-side rotor 12'. The first and second inertia rings 201' and 202' are rotatable with the output-side rotor 12', and are also rotatable relatively to the output-side rotor 12'.

Similarly to the first exemplary embodiment, the first and second inertia rings 201' and 202' are fixed by rivets 24', and are axially, radially and rotation-directionally immovable with respect to each other.

The output-side rotor 12' has a disc shape and is coupled to the output hub 5. The output-side rotor 12' includes four openings 120' in the outer peripheral part thereof, and each opening 120' includes a protruding part 121' protruding to the inner peripheral side. Additionally, the output-side rotor 12' includes circular-arc grooves 122', each of which extends in the circumferential direction. Each rivet 24' penetrates each circular-arc groove 122'. Therefore, the first and second inertia rings 201' and 202' are rotatable relatively to the output-side rotor 12' at an angle corresponding to a movable range of the trunk of each rivet 24' within each circular-arc groove 122'. In other words, the trunk of each rivets 24' and each circular-arc groove 122' compose each of stopper mechanisms that restrict relative rotation between the output-side rotor 12' and the first and second inertia rings 201' and 202'.

Each centrifugal element 21' includes a first member 211' and a second member 212', each of which extends in the rotational direction. The first and second members 211' and 212' have the same shape and are disposed at a predetermined gap in the axial direction. The first and second members 211' and 212' are disposed axially between the first inertia ring 201' and the second inertia ring 202'. The first and second members 211' and 212' are disposed on the inner peripheral side of each rivet 24', while interposing each protruding part 121' of the output-side rotor 12' therebetween. Each centrifugal element 21' is rotated together with the output-side rotor 12', and is radially movable by a centrifugal force generated by rotation of the output-side rotor 12'.

More specifically, a first guide roller 26a' and a second guide roller 26b' (a guide part) are disposed on both lengthwise directional (rotation directional) ends of the first and second members 211' and 212'. The first and second guide rollers 26a' and 26b' are rotatably attached about pins 27' supported by both ends of the first and second members 211' and 212'. Additionally, the first guide roller 26a' is capable of rolling in contact with one lateral surface 121a' of each protruding part 121' at the outer peripheral surface thereof, whereas the second guide roller 26b' is capable of rolling in contact with the other lateral surface 121b' of each protruding part 121' at the outer peripheral surface thereof. It should be noted that a construction for supporting each centrifugal element 21' will not be explained in detail. For example, it can be assumed to cause each centrifugal element 21' to make contact with the outer peripheral surface (not shown in the drawings) of each opening 120'.

It should be noted that similarly to the above, outer peripheral surfaces 211a' and 212a' of each centrifugal element 21' are recessed in a circular-arc shape to the inner peripheral side, and function as a cam 31'.

The configuration of each cam mechanism 22' is basically the same as that in the first exemplary embodiment. In other words, each cam mechanism 22' is composed of a cylindrical roller 30', functioning as a cam follower, and the cam 31' corresponding to the outer peripheral surfaces 211a' and 212a' of each centrifugal element 21'. It should be noted that in the second exemplary embodiment, each roller 30' is composed of a first roller 311' and a second roller 312'. The first roller 311' is disposed axially between the first inertia ring 201' and the output-side rotor 12', and rolls on the outer peripheral surface 211a' of the first member 211'. On the other hand, the second roller 312' is disposed axially between the second inertia ring 202' and the output-side rotor 12', and rolls on the outer peripheral surface 212a' of the second member 212'.

The action of each cam mechanism 22' is similar to that in the first exemplary embodiment, and hence, will not be herein explained.

Other Exemplary Embodiments

The present advancement is not limited to the aforementioned exemplary embodiments, and a variety of changes or modifications can be made without departing from the scope of the present advancement.

(a) In the aforementioned exemplary embodiments, each inertia ring is composed of a continuous annular member, but alternatively, can be composed of a plurality of divided inertia bodies disposed in circumferential alignment. In this case, it is required to provide a holding member such as an annular holding ring on the outer peripheral side of the plural inertia bodies so as to hold the plural inertia bodies.

(b) In the aforementioned exemplary embodiments, the centrifugal elements are disposed on the output-side rotor, whereas the cam followers are provided on the inertia rings. However, the centrifugal elements can be disposed on the inertia rings, whereas the cam followers can be provided on the output-side rotor.

(c) In the aforementioned exemplary embodiments, the guide rollers are disposed as the guide parts. However, other members for reducing friction, such as resin races, seats or so forth can be disposed instead.

Application Examples

The torque fluctuation inhibiting device described above can be disposed in a variety of settings when applied to a torque converter or other types of power transmission device. Specific application examples will be hereinafter explained with use of schematic diagrams of the torque converter and the other types of power transmission device.

Figure 9:
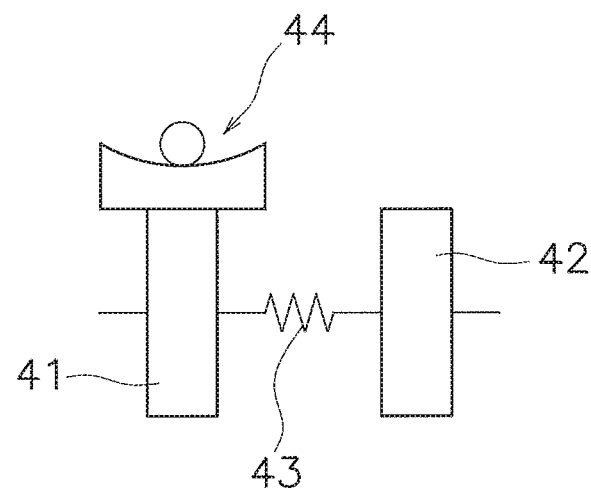
FIG. 9 is a schematic diagram showing application example 1 of the present disclosure.

(1) FIG. 9 is a diagram schematically showing a torque converter. The torque converter includes an input-side rotor 41, an output-side rotor 42 and a damper 43 disposed between both rotors 41 and 42. The input-side rotor 41 includes members such as a front cover, a drive plate and a piston. The output-side rotor 42 includes a driven plate and a turbine hub. The damper 43 includes a plurality of torsion springs.

In the example shown in FIG. 9, a centrifugal element is provided on any of rotary elements composing the input-side rotor 41, and a cam mechanism 44 is provided to be actuated with use of a centrifugal force acting on the centrifugal element. A configuration applicable to the cam mechanism 44 is similar to that in the aforementioned respective exemplary embodiments.

Figure 10:
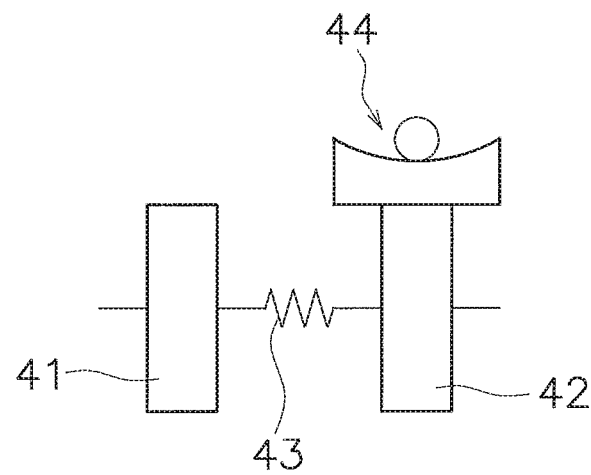
FIG. 10 is a schematic diagram showing application example 2 of the present disclosure.

(2) In a torque converter shown in FIG. 10, a centrifugal element is provided on any of rotary members composing the output-side rotor 42, and the cam mechanism 44 is provided to be actuated with use of a centrifugal force acting on the centrifugal element. A configuration applicable to the cam mechanism 44 is similar to that in the aforementioned respective exemplary embodiments.

Figure 11:
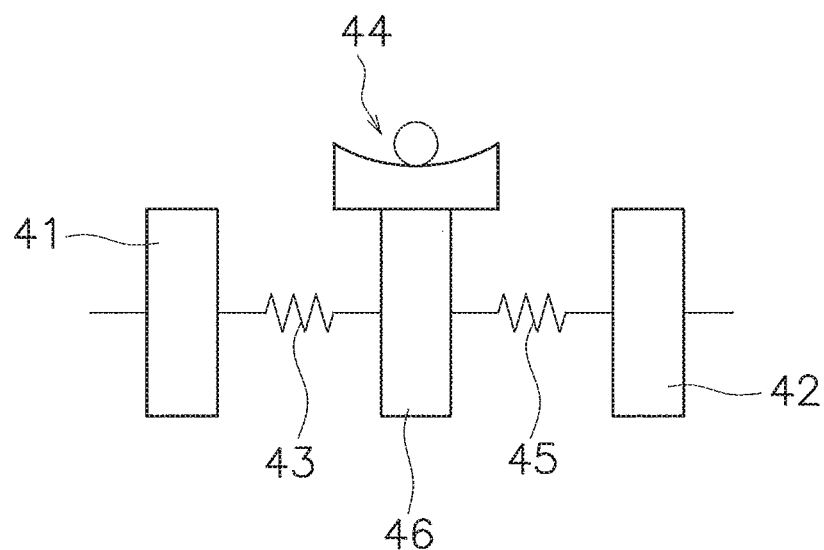
FIG. 11 is a schematic diagram showing application example 3 of the present disclosure.

(3) A torque converter shown in FIG. 11 includes another damper 45 and an intermediate member 46 provided between the two dampers 43 and 45 in addition to the configurations shown in FIGS. 9 and 10. The intermediate member 46 is rotatable relatively to the input-side rotor 41 and the output-side rotor 42, and makes the two dampers 43 and 45 act in series.

In the example shown in FIG. 11, a centrifugal element is provided on the intermediate member 46, and the cam mechanism 44 is provided to be actuated with use of a centrifugal force acting on the centrifugal element. A configuration applicable to the cam mechanism 44 is similar to that in the aforementioned respective exemplary embodiments.

Figure 12:
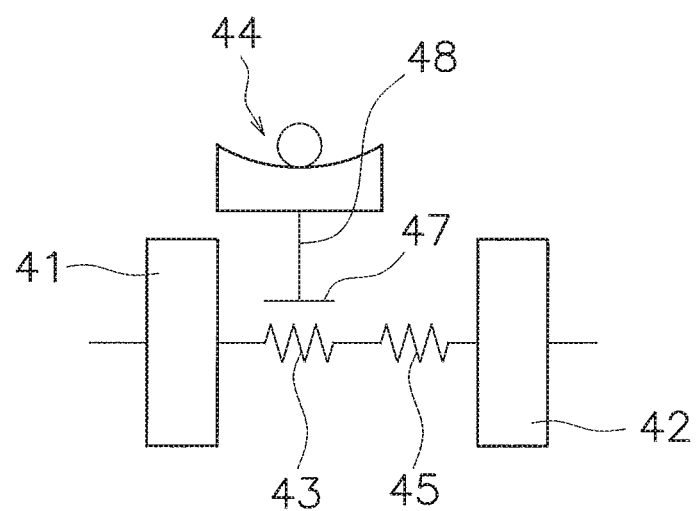
FIG. 12 is a schematic diagram showing application example 4 of the present disclosure.

(4) A torque converter shown in FIG. 12 includes a float member 47. The float member 47 is a member for supporting torsion springs composing the damper 43. For example, the float member 47 has an annular shape and is disposed to cover the torsion springs from the outer peripheral side and at least one lateral side. Additionally, the float member 47 is rotatable relatively to the input-side rotor 41 and the output-side rotor 42, and is rotated together with the damper 43 by friction with the torsion springs of the damper 43. In other words, the float member 47 is also rotated.

In the example shown in FIG. 12, the float member 47 is provided with a centrifugal element 48, and the cam mechanism 44 is provided to be actuated with use of a centrifugal force acting on the centrifugal element 48. A configuration applicable to the cam mechanism 44 is similar to that in the aforementioned respective exemplary embodiments.

Figure 13:
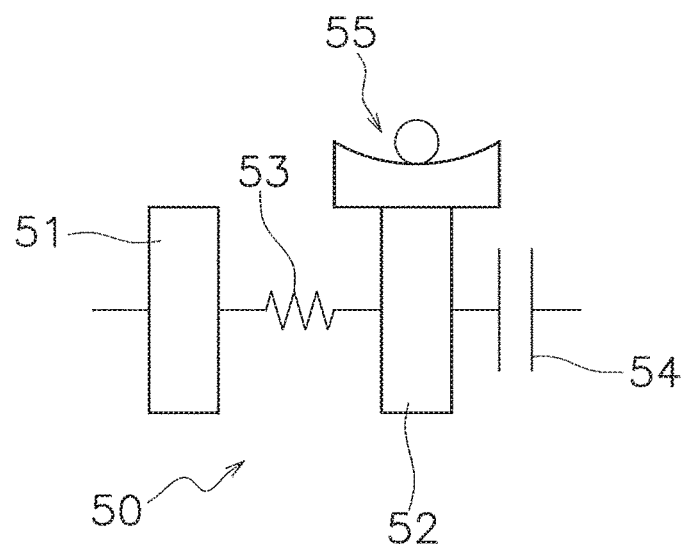
FIG. 13 is a schematic diagram showing application example 5 of the present disclosure.

(5) FIG. 13 is schematic diagram of a power transmission device that includes a flywheel 50, composed of two inertia bodies 51 and 52, and a clutch device 54. In other words, the flywheel 50, disposed between the engine and the clutch device 54, includes the first inertia body 51, the second inertia body 52 and a damper 53. The second inertia body 52 is disposed to be rotatable relatively to the first inertia body 51. The damper 53 is disposed between the two inertia bodies 51 and 52. It should be noted that the second inertia body 52 includes a clutch cover composing the clutch device 54 as one of the constituent members thereof.

In the example shown in FIG. 13, any of the rotary members composing the second inertia body 52 is provided with a centrifugal element, and a cam mechanism 55 is provided to be actuated with use of a centrifugal force acting on the centrifugal element. A configuration applicable to the cam mechanism 55 is similar to that in the aforementioned respective exemplary embodiments.

Figure 14:
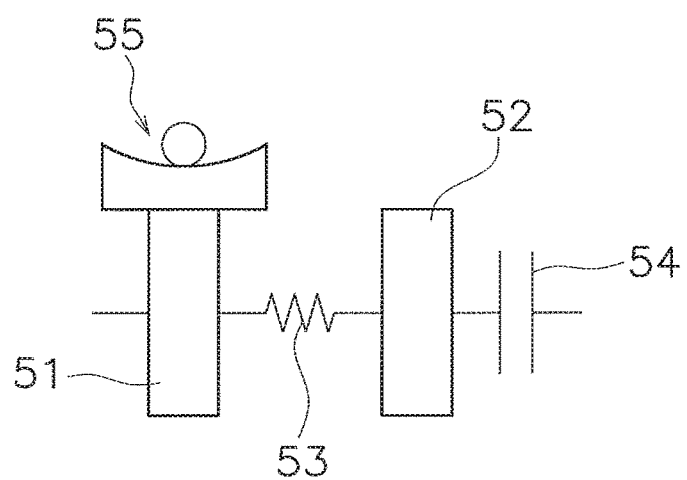
FIG. 14 is a schematic diagram showing application example 6 of the present disclosure.

(6) FIG. 14 shows an example of a power transmission device similar to that in FIG. 13. In this example, the first inertia body 51 is provided with a centrifugal element. Additionally, the cam mechanism 55 is provided to be actuated with use of a centrifugal force acting on the centrifugal element. A configuration applicable to the cam mechanism 55 is similar to that in the aforementioned respective exemplary embodiments.

Figure 15:
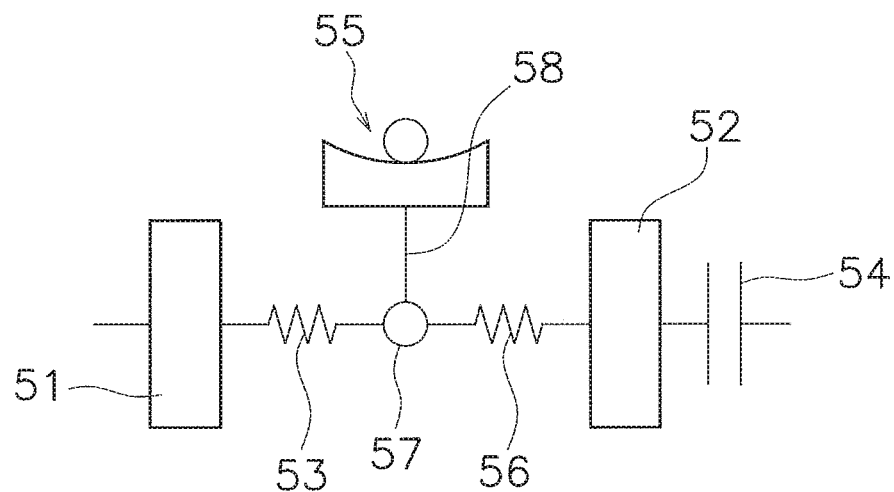
FIG. 15 is a schematic diagram showing application example 7 of the present disclosure.

(7) A power transmission device shown in FIG. 15 includes another damper 56 and an intermediate member 57 provided between two dampers 53 and 56 in addition to the configurations shown in FIGS. 13 and 14. The intermediate member 57 is rotatable relatively to the first inertia body 51 and the second inertia body 52.

In the example shown in FIG. 15, the intermediate member 57 is provided with a centrifugal element 58, and the cam mechanism 55 is provided to be actuated with use of a centrifugal force acting on the centrifugal element 58. A configuration applicable to the cam mechanism 55 is similar to that in the aforementioned respective exemplary embodiments.

Figure 16:
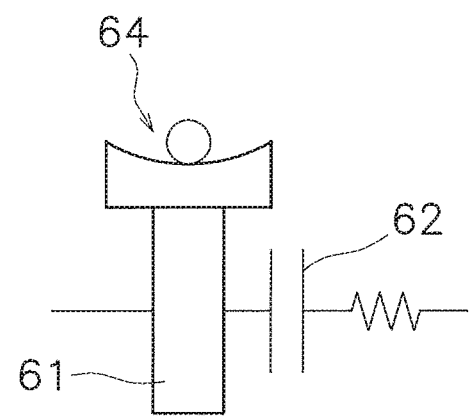
FIG. 16 is a schematic diagram showing application example 8 of the present disclosure.

(8) FIG. 16 is a schematic diagram of a power transmission device that one flywheel is provided with a clutch device. In FIG. 16, a first inertia body 61 includes one flywheel and a clutch cover of a clutch device 62. In this example, any of rotary members composing the first inertia body 61 is provided with a centrifugal element, and a cam mechanism 64 is provided to be actuated with use of a centrifugal force acting on the centrifugal element. A configuration applicable to the cam mechanism 64 is similar to that in the aforementioned respective exemplary embodiments.

Figure 17:
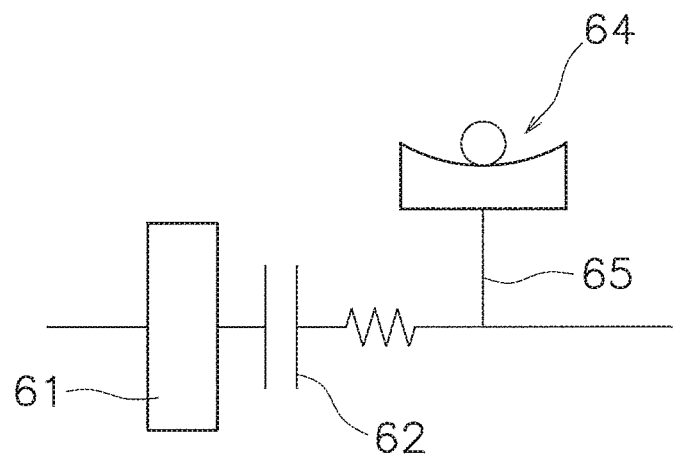
FIG. 17 is a schematic diagram showing application example 9 of the present disclosure.

(9) FIG. 17 shows an example of a power transmission device similar to that in FIG. 16. In this example, a centrifugal element is provided on an output side of the clutch device 62. Additionally, the cam mechanism 64 is provided to be actuated with use of a centrifugal force acting on the centrifugal element 65. A configuration applicable to the cam mechanism 64 is similar to that in the aforementioned respective exemplary embodiments.

(10) The torque fluctuation inhibiting device according to the present disclosure can be disposed on any of the rotary members composing the transmission, and furthermore, can be disposed on an output-side shaft (a propeller shaft or a drive shaft) of the transmission, although these configurations are not shown in the drawings.

(11) As another application example, the torque fluctuation inhibiting device of the present disclosure can be further applied to a heretofore well-known dynamic damper device or a power transmission device provided with a pendulum-type damper device.

REFERENCE SIGNS LIST

1 Torque converter
11 Input-side rotor
12 Output-side rotor
121 Protruding part
14 Torque fluctuation inhibiting device
20, 201, 202 Inertia ring (mass body)
21 Centrifugal element
211 First member
212 Second member
22 Cam mechanism
26a, 26b Guide roller
30 Roller (cam follower)
31 Cam

The invention claimed is:

1. A torque fluctuation inhibiting device for inhibiting torque fluctuations in a rotor into which a torque is inputted, the torque fluctuation inhibiting device comprising:
a mass body disposed in alignment with the rotor in an axial direction, the mass body rotatable with the rotor, the mass body rotatable relative to the rotor;
a centrifugal element disposed to receive a centrifugal force to be generated by rotation of the rotor and the mass body; and
a cam mechanism including a cam and a cam follower configured to move along the cam, the cam mechanism configured to convert the centrifugal force that acts on the centrifugal element into a circumferential force when a relative displacement occurs between the rotor and the mass body in a rotational direction due to the centrifugal force, the circumferential force directed to reduce the relative displacement, wherein
the cam is a recessed portion of a radially outer surface of the centrifugal element, the recessed portion being recessed radially inwardly from the radially outer surface of the centrifugal element,
the cam follower is provided on either of the rotor and the mass body,
the centrifugal element has a shape extending in the rotational direction, the centrifugal element including a guide part on both ends thereof in the rotational direction, the guide part making contact with a member adjacent thereto so as to guide movement of the centrifugal element,
the cam and the cam follower make contact with each other at a first contact point before the relative displacement occurs between the rotor and the mass body in the rotational direction, and the cam and the cam follower make contact with each other at a second contact point after the relative displacement occurs between the rotor and the mass body in the rotational direction, the second contact point being different from the first contact point, and
the guide part of the centrifugal element makes contact with the member adjacent thereto in an opposite position to the second contact point relative to a center of gravity of the centrifugal element.

2. A torque fluctuation inhibiting device for inhibiting torque fluctuations in a rotor into which a torque is inputted, the torque fluctuation inhibiting device comprising:
a mass body disposed in alignment with the rotor in an axial direction, the mass body rotatable with the rotor, the mass body rotatable relative to the rotor;
a centrifugal element disposed to receive a centrifugal force to be generated by rotation of the rotor and the mass body; and
a cam mechanism including a cam and a cam follower configured to move along the cam, the cam mechanism configured to convert the centrifugal force that acts on the centrifugal element into a circumferential force when a relative displacement occurs between the rotor and the mass body in a rotational direction due to the centrifugal force, the circumferential force directed to reduce the relative displacement, wherein
the cam is provided on the centrifugal element,
the cam follower is provided on either of the rotor and the mass body,
the centrifugal element has a shape extending in the rotational direction, the centrifugal element including a guide part on both ends thereof in the rotational direction, the guide part making contact with a member adjacent thereto so as to guide movement of the centrifugal element,
the cam and the cam follower make contact with each other at a first contact point before the relative displacement occurs between the rotor and the mass body in the rotational direction, and the cam and the cam follower make contact with each other at a second contact point after the relative displacement occurs between the rotor and the mass body in the rotational direction, the second contact point being different from the first contact point,
the guide part of the centrifugal element makes contact with the member adjacent thereto in an opposite position to the second contact point relative to a center of gravity of the centrifugal element, and
the mass body includes a first inertia ring and a second inertia ring, the first and second inertia rings disposed in opposition through the rotor.

3. The torque fluctuation inhibiting device according to claim 2, wherein the mass body further includes a pin, the pin penetrates the rotor in the axial direction, the pin coupling the first inertia ring and the second inertia ring such that the first inertia ring and the second inertia ring are non-rotatable relative to each other, the centrifugal element is disposed on an outer peripheral part of the rotor and on an inner peripheral side of the pin and disposed between the first inertia ring and the second inertia ring in the axial direction, the cam follower is a cylindrical roller, the cylindrical roller including a hole in an inner part thereof, the hole penetrated by the pin in the axial direction, and the cam is provided on the centrifugal element so as to make contact with the cam follower, the cam having a shape making the circumferential force vary in accordance with an amount of the relative displacement between the rotor and the mass body in the rotational direction.

4. The torque fluctuation inhibiting device according to claim 1, wherein the rotor includes a protruding part on an outer peripheral surface thereof, the centrifugal element includes a first member and a second member, the first and second members disposed to interpose the protruding part therebetween in the axial direction, the guide part of the centrifugal element couples the first member and the second member, and the guide part makes contact with both lateral surfaces of the protruding part of the rotor.

5. The torque fluctuation inhibiting device according to claim 4, wherein the guide part is a pair of rollers, the pair of rollers rotatably supported by both ends of the centrifugal element in a rotational direction, the pair of rollers configured to roll on both lateral surfaces of the protruding part of the rotor.

6. The torque fluctuation inhibiting device according to claim 2, wherein the mass body further includes a pin, the pin penetrates the rotor in the axial direction, the pin coupling the first inertia ring and the second inertia ring such that the first inertia ring and the second inertia ring are non-rotatable relative to each other, the centrifugal element is disposed on an inner peripheral side of the pin and disposed between the first inertia ring and the second inertia ring in the axial direction, the cam follower is a cylindrical roller, the cylindrical roller including a hole in an inner part thereof, the hole penetrated by the pin in the axial direction, and the cam is provided on the centrifugal element so as to make contact with the cam follower, the cam having a shape making the circumferential force vary in accordance with an amount of the relative displacement between the rotor and the mass body in the rotational direction.

7. The torque fluctuation inhibiting device according to claim 6, wherein the rotor includes a protruding part protruding to the inner peripheral side, the centrifugal element includes a first member and a second member, the first member and the second member disposed to interpose the protruding part therebetween in the axial direction, the guide part of the centrifugal element couples the first member and the second member, and the guide part makes contact with both lateral surfaces of the protruding part of the rotor.

8. The torque fluctuation inhibiting device according to claim 1, wherein the mass body has a continuous annular shape.

9. A torque converter disposed between an engine and a transmission, and having a turbine connected to the transmission, the torque converter comprising:

an input-side rotor into which the torque is inputted from the engine;

an output-side rotor configured to output the torque to the transmission;

a damper disposed between the input-side rotor and the turbine; and the torque fluctuation inhibiting device recited in claim 1.

10. A power transmission device comprising:

a flywheel including a first inertia body, a second inertia body and a damper, the first inertia body rotated about a rotational axis, the second inertia body rotated about the rotational axis, the second inertia body rotatable relative to the first inertia body, the damper disposed between the first inertia body and the second inertia body;

a clutch device provided on the second inertia body of the flywheel; and the torque fluctuation inhibiting device recited in claim 1.

* * * * *